(12) United States Patent
Yoo et al.

(10) Patent No.: US 7,583,351 B2
(45) Date of Patent: Sep. 1, 2009

(54) METHOD FOR CUTTING LIQUID CRYSTAL DISPLAY PANEL AND METHOD FOR FABRICATING LIQUID CRYSTAL DISPLAY PANEL USING THE SAME

(75) Inventors: Jung-Deog Yoo, Gyeonggi-Do (KR); Byoung-Mok Ha, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 403 days.

(21) Appl. No.: 11/477,815

(22) Filed: Jun. 30, 2006

(65) Prior Publication Data

US 2007/0153221 A1 Jul. 5, 2007

(30) Foreign Application Priority Data

Dec. 29, 2005 (KR) ............... 10-2005-0134431

(51) Int. Cl.
*G02F 1/1333* (2006.01)
*G02F 1/13* (2006.01)

(52) U.S. Cl. ........................... 349/187; 349/158
(58) Field of Classification Search ............... 349/158, 349/187
See application file for complete search history.

(56) References Cited

U.S. PATENT DOCUMENTS 7,426,883 B2 * 9/2008 Nishio et al. ............... 83/435
7,450,213 B2 * 11/2008 Kim et al. .................... 349/187
2005/0229755 A1 * 10/2005 Okajima et al. ............. 83/13
2006/0137504 A1 * 6/2006 Nishio et al. ............... 83/875
2007/0164072 A1 * 7/2007 Nishio .......................... 225/93.5
2007/0214925 A1 * 9/2007 Nishio et al. ............... 83/401
2007/0281444 A1 * 12/2007 Nishio et al. ............... 438/462

FOREIGN PATENT DOCUMENTS

EP 1 600 270 11/2005

* cited by examiner

*Primary Examiner*—Uyen Chau N Le
*Assistant Examiner*—John M Bedtelyon
(74) *Attorney, Agent, or Firm*—McKenna Long & Aldridge LLP

(57) ABSTRACT

A method for cutting a liquid crystal display panel includes transferring a pair of mother substrates on which a plurality of panel regions have been disposed to a scribing unit; forming first and second prearranged cut lines on front and rear surfaces of the mother substrates using a scribing unit; transferring the mother substrates with the first and second prearranged cut lines formed thereon to a breaking component; and moving a transfer unit which includes a body having a plurality of suction members and a steam generator installed at an edge of the body to an upper side of the mother substrates, and separating liquid crystal display panels formed at the panel regions from a dummy glass therearound while spraying steam onto the surface of the mother substrates through the steam generator of the transfer unit.

28 Claims, 9 Drawing Sheets

METHOD FOR CUTTING LIQUID CRYSTAL DISPLAY PANEL AND METHOD FOR FABRICATING LIQUID CRYSTAL DISPLAY PANEL USING THE SAME

This application claims the benefit of Korean Patent Application No. 10-2005-134431, filed on Dec. 29, 2005, which is hereby incorporated by reference for all purposes as if filly set forth herein. This application incorporates by reference co-pending application, Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and application, Ser. No. 11/467,919, now U.S. Pat. No. 7,450,213 filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a method for cutting a liquid crystal display panel and more particularly, to a method for cutting a liquid crystal panel to cut a plurality of liquid crystal display panel formed on large-scale mother substrates into a plurality of unit liquid crystal display panels, and a method for fabricating a liquid crystal display panel using the same.

2. Discussion of the Related Art

As consumer interest in information displays has grown and the demand for portable (mobile) information devices has increased, research and commercialization of light and thin flat panel displays ("FPD") has also increased. Flat panel displays may be substituted for a Cathode Ray Tube ("CRT"), which is the most common existing display device.

The liquid crystal display ("LCD") is a FPD device for displaying images by using optical anisotropy of liquid crystal. LCD devices exhibit excellent resolution and color and picture quality and as a result are widely employed in notebook computers, desktop monitors, and the like.

The typical LCD device includes a liquid crystal display panel including a driving circuit unit, a backlight unit installed at a lower portion of the liquid crystal display panel and emitting light to the liquid crystal display panel, a mold frame for supporting the backlight unit and the liquid crystal display panel, and a case.

As illustrated in FIG. 1, the liquid crystal display panel 10 includes an image display part 13 in which liquid crystal cells are arranged in a matrix form, a gate pad part 14 connected to gate lines 16 of the image display part 13 and a data pad part 15 connected to data lines 17 of the image display part 13.

The gate pad part 14 and the data pad part 15 are formed at an edge region of a thin film transistor (TFT) array substrate that does not overlap with a color filter substrate 2. The gate pad part 14 supplies scan signals provided from a gate driver (not shown) to the gate lines 16 of the image display part 13, and the data pad part 15 supplies image information provided from a data driver (not shown) to the data lines 17 of the image display part 13.

Although not shown, the color filter substrate 2 includes a color filter including red, green and blue sub-color filters implementing colors, a black matrix for separating the sub-color filters and blocking light from transmitting through a liquid crystal layer, and a transparent common electrode for applying a voltage to the liquid crystal layer.

The array substrate 1 includes a plurality of gate lines 16 and a plurality of data lines 17 arranged vertically and horizontally thereon and defining a plurality of pixel regions; a TFT to be used as a switching element formed at each crossing of the gate lines 16 and the data lines 17; and a pixel electrode formed on each pixel region.

The array substrate 1 and the color filter substrate 2 face each other and are bonded together manner by a seal pattern 40 formed at an edge of the image display part 13 to form a liquid crystal display panel 10. The attachment of the two substrates 1 and 2 with the proper alignment is facilitated through an alignment key (not shown) formed on one of the array substrate 1 and the color filter substrate 2.

To improve manufacturing yield the TFT array substrates are formed on a large-scale mother substrate while the color filter substrates are formed on a separate mother substrate. The two mother substrates are then bonded together facing each other to form a plurality of liquid crystal display panels. A cutting process is performed to cut the bonded mother substrates into a plurality of unit liquid crystal display panels.

Typically, cutting of the mother substrates is performed by forming a prearranged cut line on the mother substrates using a wheel having a hardness greater than that of glass and then forming and propagating a crack along the prearranged cut line.

FIG. 2 is a view showing the structure of a section of the unit liquid crystal display panel formed by attaching the first mother substrate on which the TFT array substrates are formed to the second mother substrate on which the color filter substrates are formed.

As shown in FIG. 2, in the unit liquid crystal panels, the thin film transistor array substrates 1 protrude at one side beyond the color filter substrates 2, because the gate pad part and the data pad part are formed at an edge portion of the thin film transistor array substrate 1 that does not overlap the color filter substrate 2.

Accordingly, the color filter substrates 2 formed on the second mother substrate 30 are separated by first dummy regions 31 each having a width corresponding to the protruding portion of the thin film transistor array substrates 1 formed on the first mother substrate 20.

The unit liquid crystal panels are typically disposed such that the first and the second mother substrates 20 and 30 can be utilized to their maximum, and though the arrangement differs depending on a model of the unit liquid crystal display panel, the unit liquid crystal panels are typically formed to be separated by the width of a second dummy region 32.

After the first mother substrate 20 having the thin film transistor array substrates 1 formed thereon and the second mother substrate 30 having the color filter substrates 2 formed thereon are attached, the substrates are cut into individual liquid crystal panels. During the cutting process, the first dummy region 31 formed at the portion where the color filter substrates 2 of the second mother substrate 30 are separated and the second dummy region 32 separating the unit liquid crystal panels are simultaneously removed.

A related art cutting process for manufacturing the liquid crystal display panel will be described hereinafter with reference to FIG. 3.

FIG. 3 is a view showing a cutting process of the liquid crystal display panel of the related art.

As shown, a cutting device of the liquid crystal display panel includes a table 42 on which the bonded first and second mother substrates 20 and 30 are loaded, and a cutting wheel 55 for processing the first and second mother substrates 20 and 30 to form prearranged cut lines 51.

When using the cutting device of the related art, after the bonded first and second mother substrates 20 and 30 having a plurality of liquid crystal display panels are loaded on the table 42, the cutting wheel 55 positioned at an upper side of the first and second mother substrates 20 and 30 is lowered and rotated to apply a certain pressure against the second mother substrate 30 to form prearranged cut lines 51 or grooves on the surface of the second mother substrate 30.

The prearranged cut lines are also formed on the first mother substrate 20. The first mother substrate 20 is processed with the cutting wheel 55 to form prearranged cut lines at the same positions as the prearranged cut lines 51 of the second mother substrate 30. Accordingly, in the liquid crystal panel cutting process of the related art, since the first and second mother substrates 20 and 30 are to be processed to form corresponding prearranged cut lines, after the second mother substrate 30 is processed with the cutting wheel 55, the liquid crystal panel is reversed to have the first mother substrate 20 face upward and the first mother substrate 20 is processed with the cutting wheel 55.

Thereafter, pressure is applied to the prearranged cut lines 51 formed on the first and second mother substrates 20 and 30 to separate the first and second mother substrates 20 and 30 along the prearranged cut lines 51. The first and second mother substrates 20 and 30 are separated by striking the first and second mother substrates 20 and 30 with a breaking bar to make and propagate a crack along the prearranged cut lines 51.

In cutting the liquid crystal display panel, a scribing process and a breaking process are performed several times through a plurality of reversals and positionings of the substrates 20 and 30. The significant amount of time used for the scribing process and the breaking process reduces productivity of the overall manufacturing process.

In addition since the mother substrates are struck with the breaking bar to make cracks along the prearranged cut lines formed on the mother substrates, a plurality of glass chips are generated. Further, if the striking is performed inaccurately or if crack propagation is incomplete, the liquid crystal display panel may be damaged or torn off when it is extracted.

SUMMARY OF THE INVENTION

Accordingly, the present invention is directed to a method for cutting liquid crystal display panel and method for fabricating liquid crystal display panel using the same that substantially obviates one or more of the problems due to limitations and disadvantages of the related art.

Therefore, one aspect of the present invention involves the recognition by the present inventors of the drawbacks in the related art as explained above.

An advantage of the present invention is to provide a method for cutting a liquid crystal display panel capable of shortening time required for cutting a liquid crystal display panel, and a method for fabricating a liquid crystal display panel using the same.

Another advantage of the present invention is to provide a method for cutting a liquid crystal display panel capable of extracting a liquid crystal display panel from a large-scale mother substrate without damage, and a method for fabricating a liquid crystal display panel using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for transferring a liquid crystal display panel including: a body having a plurality of suction members; and a steam generator installed at an edge of the body to spray steam toward a mother substrate.

In another aspect of the present invention, a method for cutting a liquid crystal display panel includes: transferring a pair of mother substrates on which a plurality of panel regions has been disposed to a scribing unit; forming first and second prearranged cut lines on front and rear surfaces of the mother substrates using a scribing unit; transferring the mother substrates with the first and second prearranged cut lines formed thereon to a breaking component; and moving a transfer unit which includes a body having a plurality of suction members and a steam generator installed at an edge of the body to an upper side of the mother substrates, and separating liquid crystal display panels formed at the panel regions from a dummy glass therearound while spraying steam onto the surface of the mother substrates through the steam generator of the transfer unit.

In another aspect of the present invention, a method for fabricating a liquid crystal display panel includes: providing mother substrates divided into a plurality of panel regions; performing an array process on the mother substrate for an array substrate and performing a color filter process on the mother substrate for a color filter substrate; forming an alignment film on the surface of the mother substrates; performing rubbing on the alignment film-formed mother substrates; attaching the pair of rubbing-finished mother substrates; forming first and second prearranged cut lines on front and rear surfaces of the attached mother substrates; and moving a transfer unit which includes a body having a plurality of adsorption members and a steam generator installed at an edge of the body onto the mother substrates, and separating liquid crystal display panels formed at the panel regions from a dummy glass therearound while spraying steam onto the surface of the mother substrates through the steam generator of the transfer unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiment of the present invention, examples of which are illustrated in the accompanying drawings.

Figure 1:
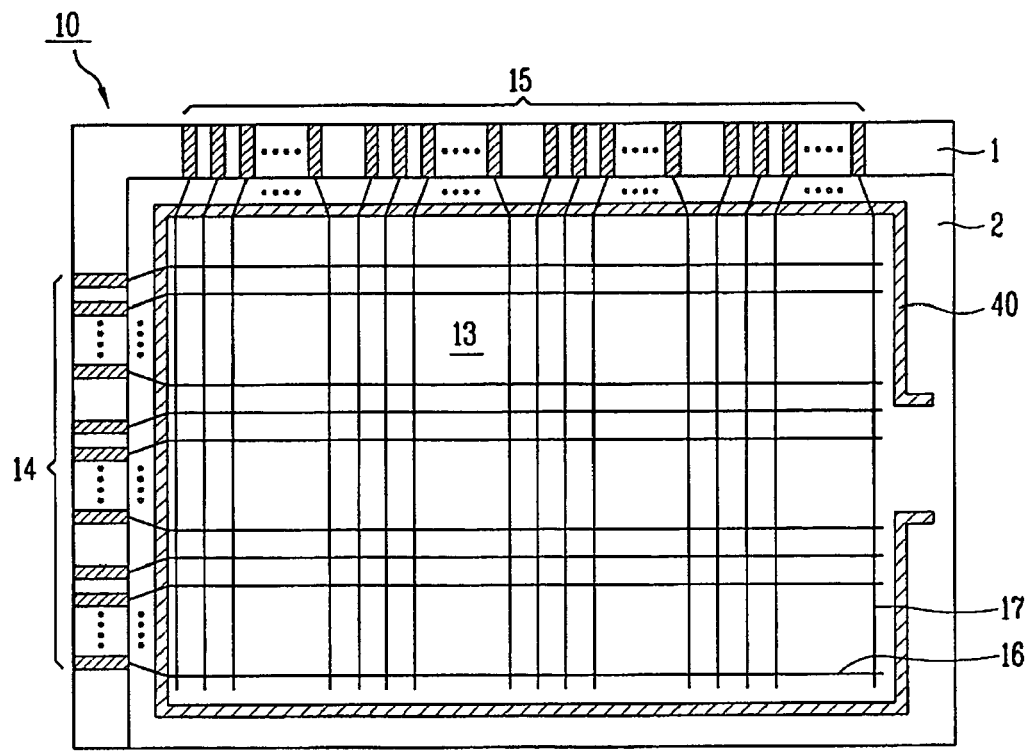
FIG. 1 is an plan view showing a plane structure of a unit liquid crystal display panel formed by attaching a thin film transistor (TFT) array substrate and a color filter substrate in a facing manner.
Figure 2:
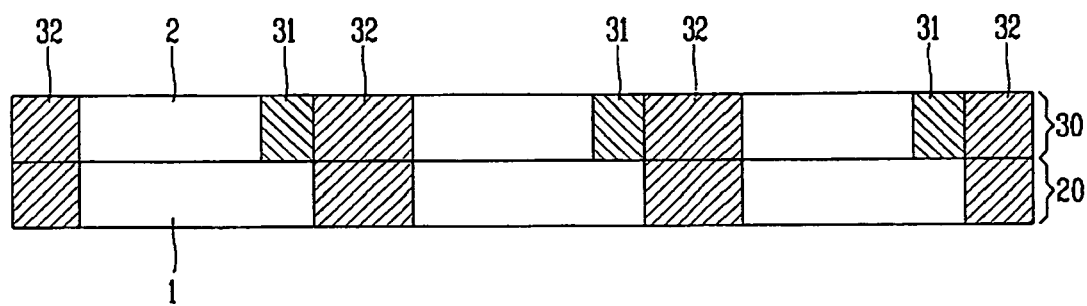
FIG. 2 is a view showing the structure of a section of the unit liquid crystal display panel formed by attaching the first mother substrate on which the TFT array substrates are formed and the second mother substrate on which the color filter substrates are formed.
Figure 3:
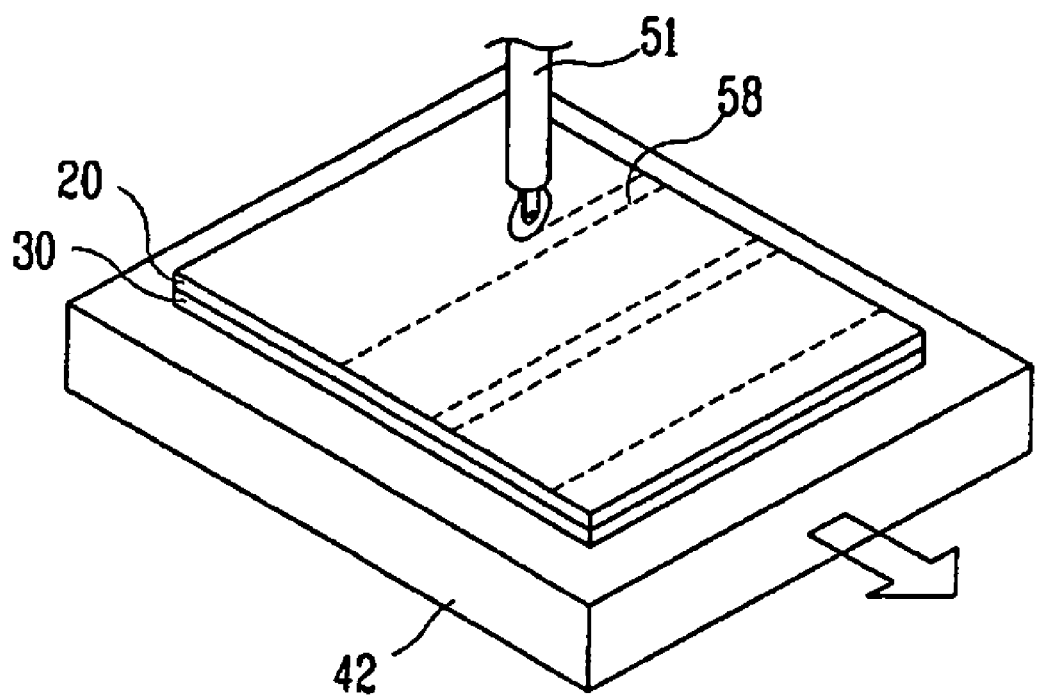
FIG. 3 is a plan view showing a cutting process of a liquid crystal display panel.
Figure 4:
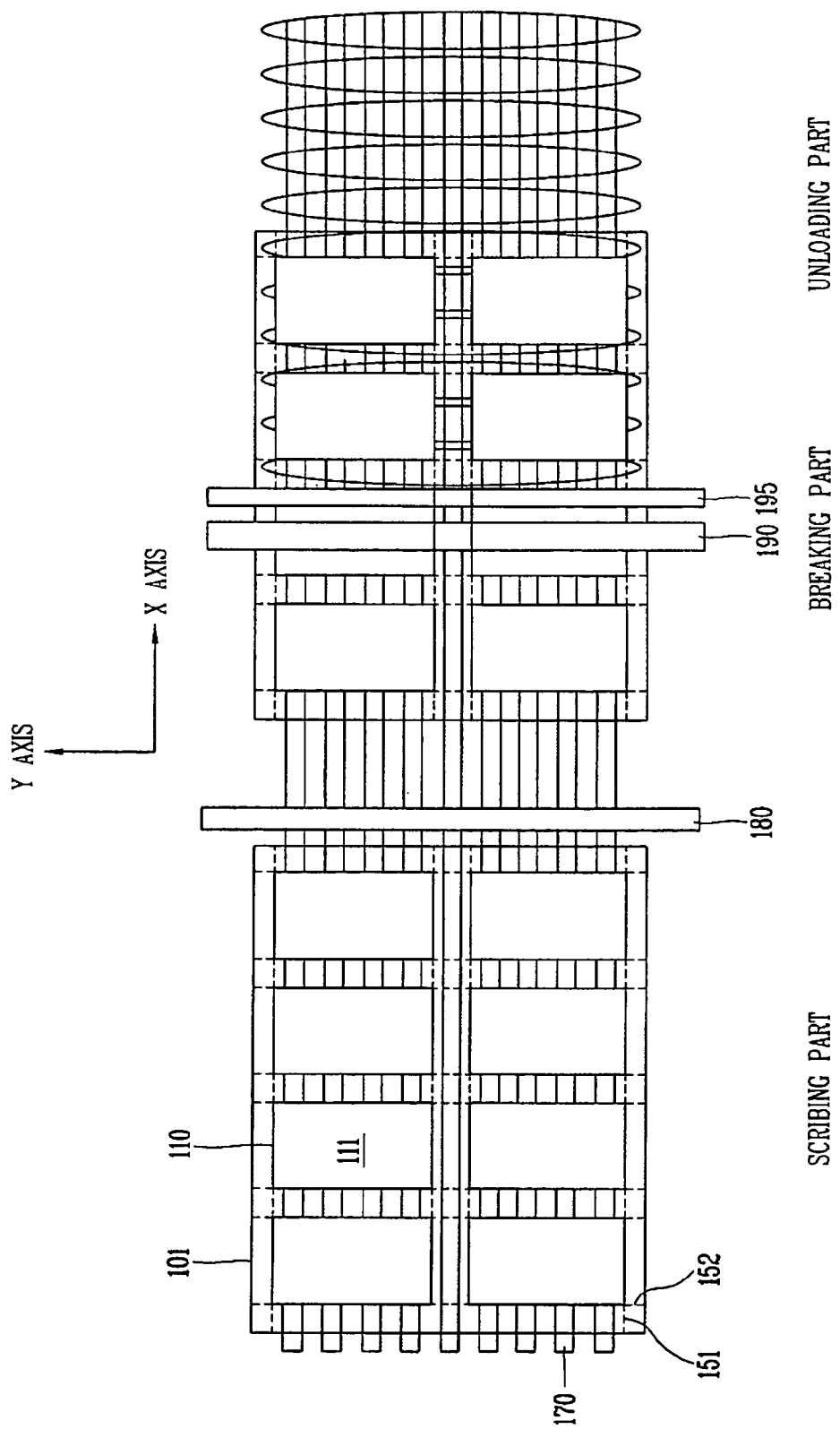
FIG. 4 is a plan view showing a cutting process of a liquid crystal display panel in accordance with an embodiment of the present invention.

FIG. 4 is a plan view showing a cutting process of a liquid crystal display panel in accordance with a first embodiment of the present invention.

As shown in FIG. 4, a pair of bonded mother substrates 101 on which a plurality of panel regions 111 have been arranged are transferred to a scribing component through a conveying unit to be divided into individual unit liquid crystal display panels 110 along the panel regions 111.

The panel regions 111 may comprise upper panel regions and lower panel regions. The upper panel regions 111 can be array substrate on which thin film transistors (TFTs) have been formed through an array process, and the lower panel region 111 can be a color filter substrate on which color filters have been formed through a color filter process. In the illustrated embodiment of the present invention, the panel regions 111 have the same size, but the present invention is not limited thereto and the panel regions 111 can be formed to have at least two different sizes with the upper array substrate and the lower color filter substrate bonded together to form a unit liquid crystal display panel 110.

In the FIG. 4, the conveying unit is illustrated as including a plurality of conveyer belts 170, but the present invention is not limited thereto and the conveying unit may alternatively include a plurality of transfer rollers. In addition, the conveying unit may include a first conveying component formed as a conveyer belt coupled to a second conveying component formed as a transfer roller.

After the mother substrates 101 are transferred to the scribing component, first prearranged cut lines 151 are formed to section the panel regions 111 on the front and rear surfaces of the mother substrates 101 in a first direction using a scribing unit 180.

The scribing unit 180 is driven along an X-axis direction. The scribing unit 180 includes a pair of scribing heads (not shown) and repeatedly (e.g. four times) performs a first scribing process to form the first prearranged cut lines 151 in the first direction, (along the X-axis direction) on the mother substrates 101 using the scribing heads.

After the first scribing process in the first direction is complete, a second scribing process is initiated. In the second scribing process, the scribing unit 180 is maintained at a certain position with respect to an X-axis and the heads of the scribing unit 180 are driven in a Y-axis direction to form second prearranged cut lines 152 for sectioning the panel regions 111 on the front and rear surfaces of the mother substrates 101 in a second direction. To form the second prearranged cut lines 152 on the mother substrates 101 through the scribing heads, the scribing along the Y-axis direction is repeated eight times.

In this above described example using the embodiment of the present invention illustrated in FIG. 4, the first scribing process is performed four times in the X-axis direction and the second scribing process is performed eight times in the Y-axis direction to form the total eight sheets of liquid crystal display panels 110 on the large-scale mother substrates 101, but the present invention is not limited thereto and the first and second scribing process may include any number of repetitions of scribing in the X and Y axes directions.

The scribing unit 180 includes scribing heads formed at the upper and lower portions thereof to scribe the first and second prearranged cut lines 151 and 152 on the front and rear surfaces of the mother substrates 101, and a scribing wheel made of a material having a greater hardness than that of glass is mounted at each scribing head.

After the scribing process including scribing in the first and second directions is complete, the mother substrate 101 is moved to the breaking component where a breaking process is performed. In the breaking component, steam is sprayed onto the front and rear surfaces of the mother substrates 101 through a steam break 190 disposed substantially perpendicular to a proceeding direction of the mother substrates 101 to create an propagate a crack along the prearranged cut lines 151 and 152 to thereby separate the liquid crystal display panels 110.

The steam break 190 includes a body for receiving water through a water supply pipe; a heating unit provided inside the body to heat water supplied through the water supply pipe to generate steam; and a spraying unit for spraying steam generated by the heating unit onto the surface of the mother substrates 101.

Steam generated by the spraying unit is sprayed onto the front and rear surfaces of the mother substrates 101 at a temperature of about 100° C. to about 250° C. to expand the mother substrates 101 made of the glass material through heat and pressure. The portions where the first and second prearranged cut lines 151 and 152 of the mother substrates 101 are formed are expanded to make and propagate cracks along the first and second prearranged cut lines 151 and 152 to separate the liquid crystal display panels.

An air knife 195 for spraying dried air with a certain pressure is installed at a rear surface of the steam break 190 to remove moisture or glass chips remaining on the surface of the mother substrates 101 after the steam is sprayed on the mother substrates 101 and to further propagate the cracks formed along the first and second prearranged cut lines 151 and 152.

As stated above, according to the method for cutting the liquid crystal display panel in the first embodiment of the present invention, the first prearranged cut lines 151 are formed simultaneously on the front and rear surfaces of the mother substrates 101 and then the scribing heads are driven in the Y-axis direction to simultaneously form the second prearranged cut lines 152 on the front and rear surfaces of the mother substrates 101. Thus, without having to rotate or reverse the mother substrates 101, the first and second prearranged cut lines 151 and 152 can be formed on both the front and rear surfaces of the mother substrates 101.

In addition, once the first and second prearranged cut lines 151 and 152 have been formed, a crack is formed along the first and second prearranged cut lines 151 and 152 by using the steam break 190 and the air knife 195 to separate the unit liquid crystal display panels 110. Thus, compared with the breaking process performed by striking using the break bar, the process time can be shortened. Further, the damage to the liquid crystal display panels associated with the striking process of the related art may be prevented.

The unit liquid crystal display panels 110 once separated from the mother substrates 101 through the scribing process and the breaking process are extracted through a transfer unit such as a trans hand 160 (shown in FIG. 5A) and transferred to an apparatus for carrying out a subsequent processing such as a reversing unit.

In addition to performing the role of extracting the liquid crystal display panels 110 from the mother substrates 101 and transferring them to the reversing unit, the trans hand 160 also serves to further propagate the cracks formed along the first and second prearranged cut lines 151 and 152 to completely separate any dummy glass around the liquid crystal panels 110 from the liquid crystal display panels 110 through a breaking process.

A stream generator with a certain form is attached at an edge of the trans hand 160 to spray stream to the prearranged cut lines 151 and 152 before the liquid crystal display panels 110 are extracted to make and/or further propagate the cracks along the prearranged cut lines 151 and 152. The steam generator may have a form corresponding to the shape of a liquid crystal display panel. Alternatively, the steam generator may have a circular or rectangular shape. Damage to the liquid crystal display panel 110 due to incomplete separation from the dummy area glass can be prevented by removing the dummy glass by using a pusher as described below with reference to FIGS. 5A to 5E.

FIGS. 5A to 5E are exemplary views showing a process of sequentially extracting a unit liquid crystal display panel from a mother substrate by using the trans hand including a second breaking process using the trans hand.

Figure 5A:
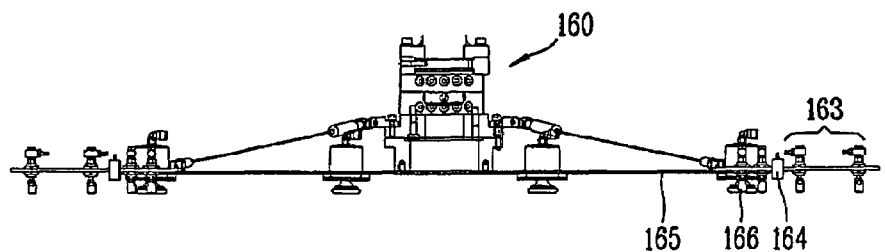
FIGS. 5A to 5E illustrate a process of sequentially extracting a unit liquid crystal display panel from a mother substrate by using the trans hand.

As shown in FIG. 5A, after the scribing process and the first breaking process are finished, the trans hand 160 is moved to be positioned above the liquid crystal display panel 110.

A body 165 of the trans hand 160 includes a plurality of suction members 166, to which each liquid crystal display panel 110 is affixed to allow separation and extraction from the mother substrate. The suction members may include suction cups.

Steam generators 164 having a certain form are formed at an edge of the body 165 of the trans hand 160. In this case, a plurality of steam generators 164 can be formed along the edge of the body 165 of the trans hand 160, and they can be formed as a single connected rectangular form. The steam generator 164 can be installed at the trans hand 160 such that it can be positioned near the prearranged cut line 150 where the lower liquid crystal display panel 110 and the dummy glass 112 contact with each other, or can be controlling its position within the trans hand 160.

Pushers 163 for applying a pushing force to the dummy glass 112 are installed at an outer side of the steam generator 164. The push from the pushers removes dummy glass 112 not previously completely separated from the liquid crystal display panel 110.

The trans hand 160 is moved downward to be close to the surface of the liquid crystal display panel 110 to be extracted.

Figure 5B:
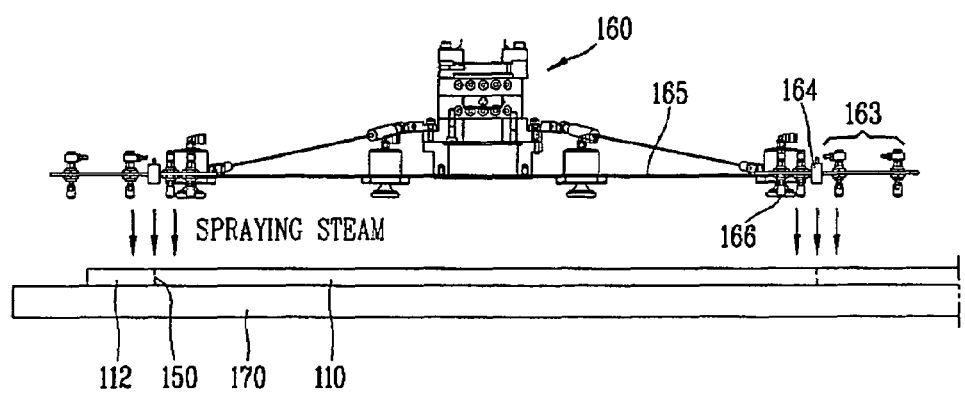

As shown in FIG. 5B, while spraying steam toward the prearranged cut line 150 through the steam generator 164 of the trans hand 160, the trans hand 160 nears the surface of the liquid crystal display panel 110.

Figure 5C:
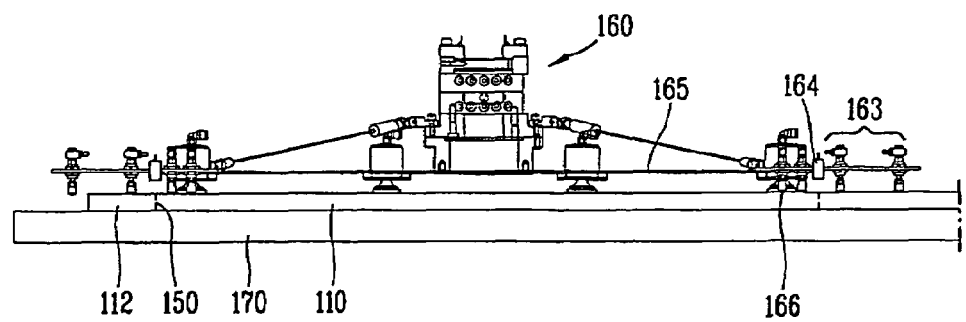

As shown in FIG. 5C, with the trans hand 160 in contact with the surface of the liquid crystal display panel 110, the suction members 166 of the trans hand 160 are vacuum affixed onto the surface of the liquid crystal display panel 110.

The spraying of steam through the steam generator 164 is maintained for a certain pre-set time to further make and propagate cracks along the prearranged cut lines 150 to separate the dummy glass 112 from the liquid crystal display panel 110.

Figure 5D:
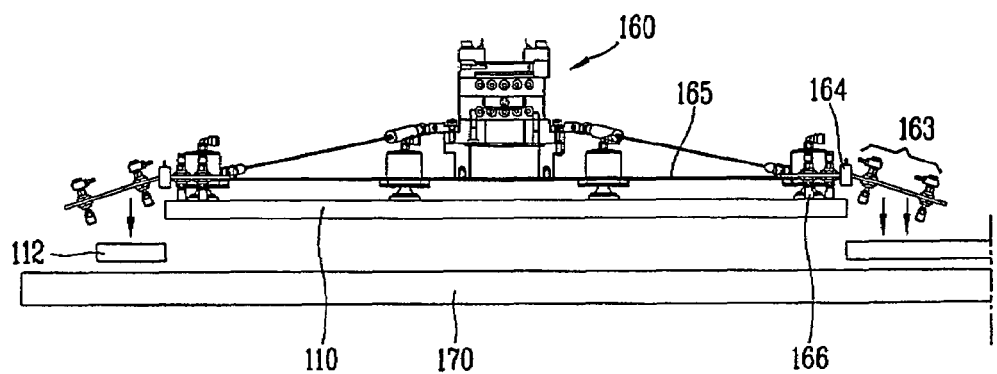

Thereafter, as shown in FIG. 5D, the trans hand 160 is moved upward and the liquid crystal display panel 110 affixed on the suction members 166 of the trans hand 160 is separated from the dummy glass 112 and moved together with the trans hand 160. Since the pushers 163 are installed at the edge of the trans hand 160 and substantially at the outer side of the steam generator 164, although a portion of the dummy glass 112 around the liquid crystal display panel 110 may not been separated from the liquid crystal display panel 110, a portion of the dummy glass 112 which has not yet been separated can be pushed down by the pushers 163 to be completely separated from the liquid crystal display panel 110.

Figure 5E:
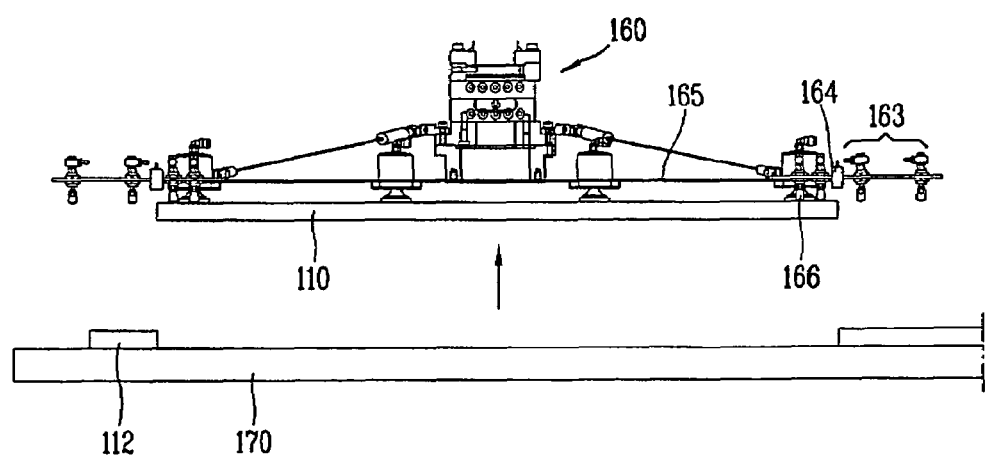

After the liquid crystal display panel 110 and the dummy glass 112 are completely separated, as shown in FIG. 5E, the trans hand 160 is driven upward to transfer the liquid crystal display panel 110 affixed onto the suction members 166 to the reversing unit, with the separated dummy glass 112 remaining on a conveyer belt.

As described above by spraying steam toward the prearranged cut lines 150, cracks can be formed and/or propagated along the prearranged cut lines 150 and the dummy glass 112 can be completely separated from the liquid crystal display panel 110. As a result, when the liquid crystal display panel 110 is extracted, damage to and tearing apart of the liquid crystal display panel may be avoided.

In the above-described embodiment of the present invention, a first breaking process is performed by using the steam break 190 and the air knife 195, after which a second breaking process is performed by using the steam generator 164 of the trans hand 160. However, the present invention is not to this sequence of operations, and if the cracks are sufficiently formed at the prearranged cut lines 150 by the steam generator 164 of the trans hand 160, the first breaking process can be omitted and the breaking process by using the steam generator 164 can be performed without the first breaking process.

Figure 6:
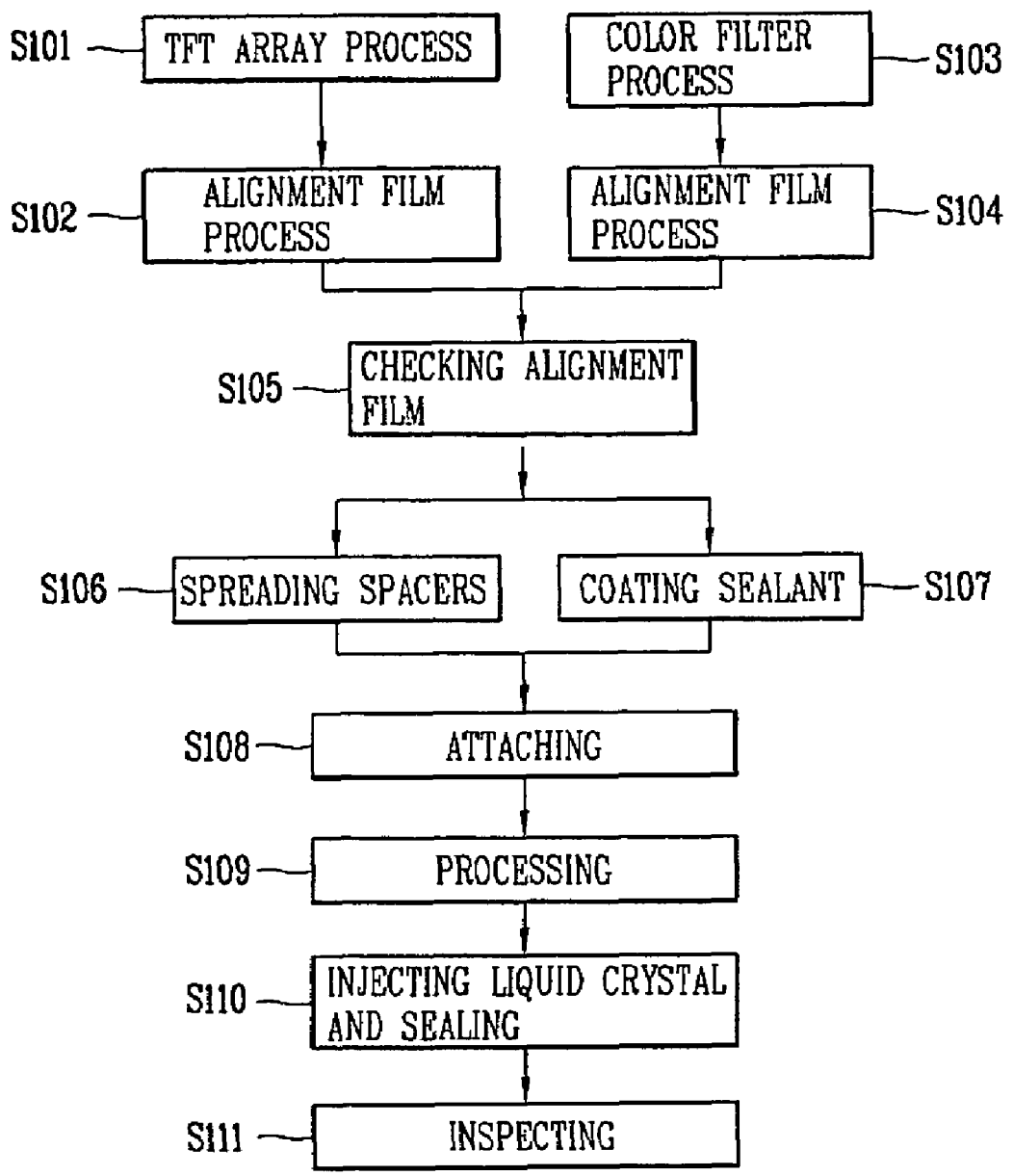
FIG. 6 is a flow chart illustrating the sequence of processes of one method for fabricating a liquid crystal display panel in accordance with an embodiment the present invention.
Figure 7:
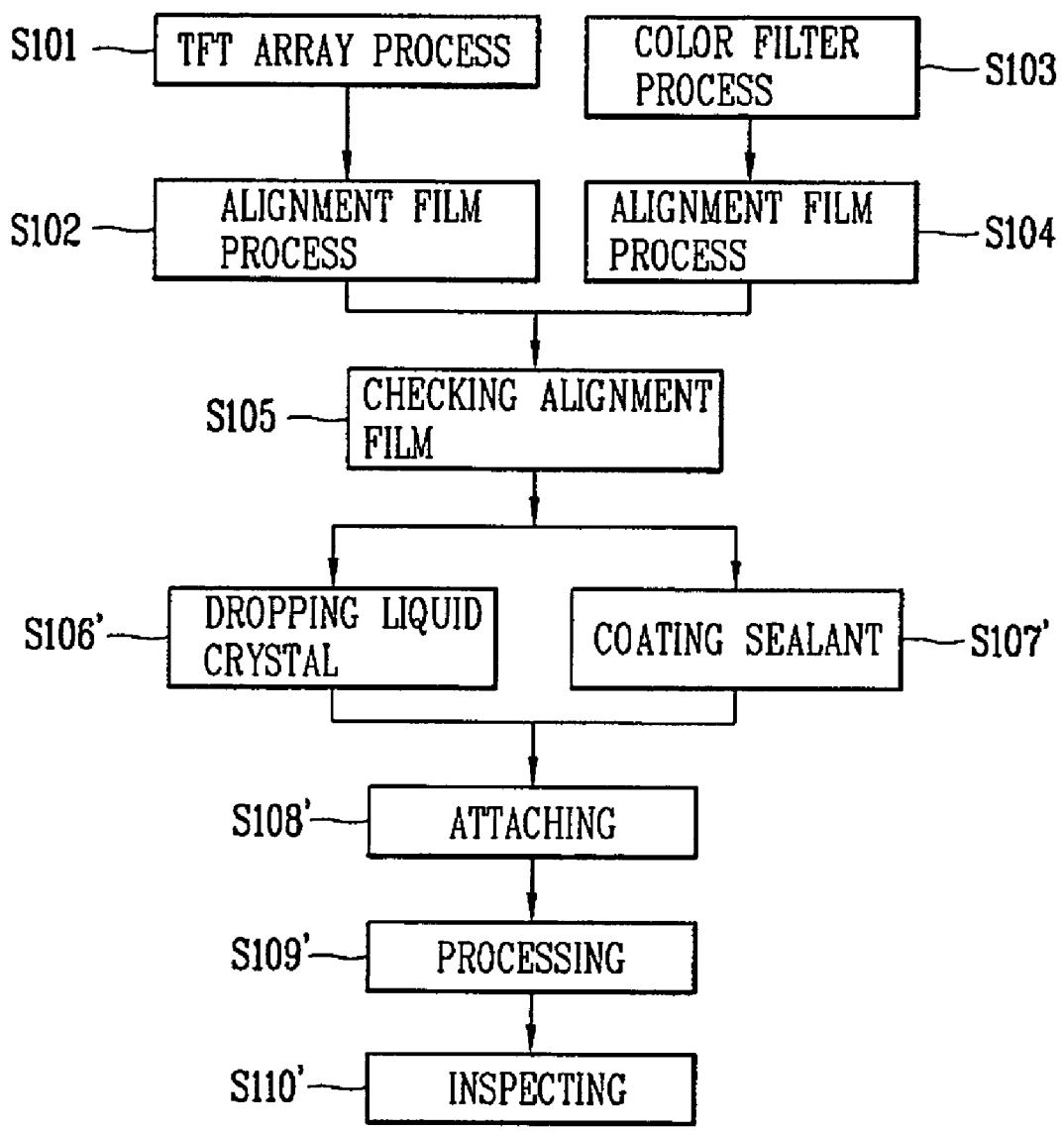
FIG. 7 is a flow chart illustrating the sequence of processes of a method for fabricating a liquid crystal display panel in accordance with another embodiment the present invention the present invention.

FIG. 6 is a flow chart illustrating the processes of one method for fabricating a liquid crystal display panel in accordance with the present invention, and FIG. 7 is a flow chart illustrating the processes of another method for fabricating a liquid crystal display panel in accordance with the present invention.

Specifically, FIG. 6 shows a method for fabricating an LCD in which a liquid crystal layer is formed by a liquid crystal injection method, and FIG. 7 shows a method for fabricating an LCD in which a liquid crystal layer is formed by a liquid crystal dropping method.

The process for fabricating the liquid crystal display panel can be divided into a switching device array process for forming a switching device on the lower array substrates; a color filter process for forming a color filter on the upper color filter substrate; and a cell process for attaching the array substrate and the color filter substrate.

In the switching device array process, a plurality of gate lines and a plurality of data lines arranged to define pixel regions on the lower substrate are formed and a TFT, a switching device, is formed to be connected to the gate lines and the data lines at each of the pixel regions (step S101). In addition, a pixel electrode connected to the TFT to drive the liquid crystal layer using a signal applied thereto through the TFT is formed through the switching device array process.

A color filter layer comprising red, green and blue sub-color filters implementing color and a common electrode may be formed on the upper substrate through the color filter process (step S103).

When an in-plane switching (IPS) mode LCD device is being fabricated, common electrodes are instead formed on the lower substrate on which the pixel electrodes have been formed through the array process.

Subsequently, an alignment film is printed on the upper and lower substrates. A rubbing process is performed on the alignment film on each substrate to establish an anchoring force or a surface fixing force to establish the initial alignment (i.e., a pretilt angle and an alignment direction) for liquid crystal molecules of a liquid crystal layer formed between the upper and lower substrates (step S102 and S104).

After the rubbing process is finished, the upper and lower substrates are inspected as to determine whether the alignment films are defective using an alignment film inspecting device (step S105).

The liquid crystal display panel uses electro-optic effects of liquid crystal, and since the electric optical effect is determined by anisotropy of the liquid crystal itself and a state of arrangement of liquid crystal molecules, controlling of the arrangement of liquid crystal molecules greatly influences the stabilization of display quality of the liquid crystal display panel.

Accordingly, the alignment film forming process for establishing the initial aligning of the liquid crystal molecules is of great importance with respect to establishing the picture quality in a liquid crystal display panel.

A method for inspecting for a rubbing deficiency includes a first inspecting process to detect whether the coated alignment film has a blur, a strip or a pin hole on its surface, and a second inspecting process to detect non-uniformities in the surface of the rubbed alignment film and to detect whether the surface of the alignment film is scratched are performed.

After the inspection of the alignment film is completed, as shown in FIG. 6, spacers for uniformly maintaining a cell gap are formed on the lower substrate and a sealant is coated on an outer edge of the upper substrate. The lower and upper substrates are attached or bonded by applying a pressure thereto (steps S106~S108). The spacers can be ball spacers dispersed according to a spreading method, or can be columnar spacers formed through patterning.

The lower and upper substrates are formed as large-scale glass substrates or mother substrates. A plurality of panel regions are formed on the large-scale glass substrates, and the TFT, the switching device, and the color filter layer are formed at each panel region. The glass substrates are cut and processed to separate the mother substrates into individual liquid crystal panels (step S109).

Methods for cutting a liquid crystal display panel in accordance with embodiments of the present invention to separate the mother substrates into individual liquid crystal panels will now be described in detail with reference to FIGS. 8 and 9.

Figure 8:
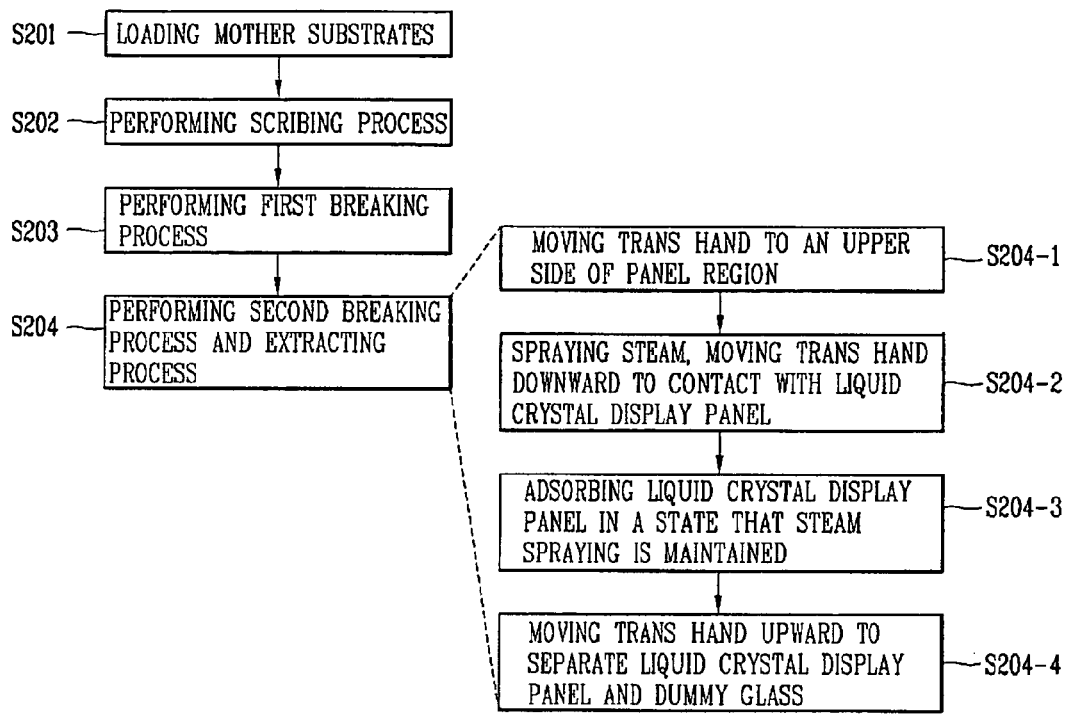
FIG. 8 is a flow chart illustrating the sequence of processes of a method for cutting a liquid crystal display panel in FIGS. 6 and 7 in accordance with a first embodiment of the present invention.
Figure 9:
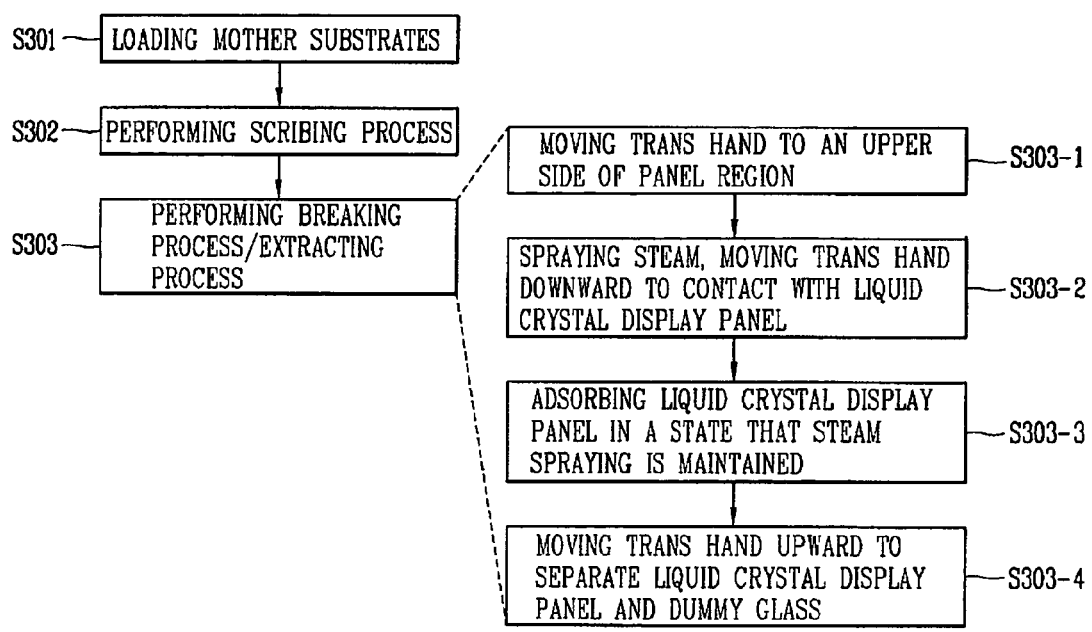
FIG. 9 is a flow chart illustrating the sequence of processes of a method for cutting a liquid crystal display panel in FIGS. 6 and 7 in accordance with a second embodiment of the present invention.

FIG. 8 is a flow chart illustrating a sequence of processes of a method for cutting a liquid crystal display panel in FIGS. 6 and 7 in accordance with a first embodiment of the present invention, and FIG. 9 is a flow chart illustrating a sequence of processes of a method for cutting a liquid crystal display panel in FIGS. 6 and 7 in accordance with a second embodiment of the present invention.

Specifically, FIG. 8 shows a method for cutting a liquid crystal display panel in which the first breaking process is performed by using the steam breaker and the air knife and the second breaking process is performed by using the steam generator attached at the trans hand, and FIG. 9 shows an example of a method for cutting the liquid crystal display panel in which the breaking process and the extracting process are performed together by using the steam generator attached at the trans hand.

First, the pair of bonded mother substrates on which the plurality of panel regions has been formed are loaded and transferred to the first scribing component through the transfer unit (steps S201 and S301). The TFT switching elements and the color filters have been formed on the upper and lower panel regions. The upper and lower panel regions have been bonded together to form liquid crystal display panels.

After being transferred to the scribing component, the first prearranged cut lines are formed to section the panel regions in the first direction and the second prearranged cut lines are formed to section the panel regions in the second direction on the front and rear surfaces of the mother substrates using the first scribing unit (steps S202 and S302).

After the scribing process including scribing in the first and second directions is complete, the mother substrates are moved to the breaking component in which steam and dry air are sprayed onto the front and rear surfaces of the mother substrates through the steam break and the air knife (the breaking units) during the first breaking process to form cracks along the prearranged cut lines (step S203).

After the scribing process and the first breaking process are completed on the mother substrates, the trans hand is moved to a position above a liquid crystal display panel to be extracted (steps S204-1 and S303-1).

Step S204 of FIG. 8 shows the case in which after the first breaking process is performed by using the steam break and the air knife and the second breaking process is performed by using the trans hand, while step S303 of FIG. 9 shows the case in which the first breaking process is omitted and only the second breaking process is performed by using the trans hand.

Thereafter, the trans hand is moved downward to approach the surface of the liquid crystal display panel to be extracted. While steam is being sprayed toward the prearranged cut lines through the steam generator of the trans hand, the trans hand contacts the liquid crystal display panel (steps S204-2 and S303-2).

With the trans hand in contact with the surface of the liquid crystal display panel, the suction members of the trans hand are affixed onto the surface of the liquid crystal display panel to be extracted.

Steam spraying through the steam generator is maintained for a certain pre-set time to create and propagate cracks formed along the prearranged cut lines to allow the dummy glass to be separated from the liquid crystal display panel (steps S204-3 and S303-3).

Thereafter the trans hand is moved upward and the liquid crystal display panel affixed onto the suction members of the trans hand is separated from the dummy glass and moved upward together with the trans hand. If a portion of the dummy glass has not been separated from the liquid crystal display panel, the non-separated portion of the dummy glass can be physically removed by using the pusher installed at an outer edge of the trans hand to completely remove the dummy glass from the liquid crystal display panel (steps S204-4 and S303-4).

Thereafter, as shown in FIG. 6, liquid crystal may be injected through a liquid crystal injection opening of each unit liquid crystal display panel. After the liquid crystal is injected, the liquid crystal injection opening is sealed to form a liquid crystal layer, and each unit liquid crystal display panel is inspected, thereby finishing fabrication of each of the unit liquid crystal display panels (steps S110 and S111).

The liquid crystal may be injected by using a vacuum injection method using a pressure difference. In the vacuum injection method, the liquid crystal injection opening of the unit liquid crystal display panel is put in a container filled with liquid crystal in a chamber with a certain degree of vacuum. The degree of vacuum is then changed to allow liquid crystal to be injected into the liquid crystal display panel according to a pressure difference between the interior and the exterior of the liquid crystal display panel. When the liquid crystal has filled inside the liquid crystal display panel to form a liquid crystal layer, the liquid crystal injection opening is sealed. As described above, to form the liquid crystal layer of the liquid crystal display panel through the vacuum injection method, a portion of a seal pattern is open for injecting the liquid crystal.

However, the vacuum injection method has the following problems.

First, a relatively long time is used to inject the liquid crystal into the liquid crystal display panel. Typically, the attached liquid crystal display panel has an area of hundreds of $cm^2$ and an opening for injecting liquid crystal of merely a few μm across. Accordingly, the quantity of liquid crystal injected per unit hour using the vacuum injection method is inevitably small. For example, about 8 hours are required for injecting the liquid crystal to fabricate a 15-inch liquid crystal display panel. The time required to inject the liquid crystal into the liquid crystal display panel reduces the overall productivity of the manufacturing process. In addition, as the liquid crystal display panel increases in size, the time taken for injecting liquid crystal increases, and a defective filling of liquid crystal may also occur. For these reasons, the vacuum injection method may have limited use when manufacturing large liquid crystal display panels.

Secondly, the vacuum injection method uses a large amount of liquid crystal. Typically, the amount of liquid crystal actually injected into the liquid crystal display panel is quite small compared with the amount of liquid crystal filled in the container. When liquid crystal is exposed to the air or to certain gases, the liquid crystal reacts with the air or gas and is degraded. Thus, although the liquid crystal filled in the container is used to fill a plurality of unit liquid crystal display panels, a large amount of the liquid crystal remaining in the container after completing the filling is discarded. Accordingly, the unit cost of the liquid crystal panel is increased, reducing the price competitiveness of the LCD panels.

In order to solve the above-described problems associated with the vacuum injection method a dropping method may be employed to form the liquid crystal layer.

As shown in FIG. 7, when using the dropping method, after the alignment film is inspected (step S105), a certain seal pattern is formed with a sealant on the color filter substrate and a liquid crystal layer is formed on the array substrate (steps S106' and S107') by dropping the liquid crystal on the large-scale first mother substrate where a plurality of array substrates is disposed. Alternatively, the liquid crystal may be dropped on an image display region of the second mother substrate where the plurality of color filter substrates is disposed.

After liquid crystal is dropped, the first and second mother substrates are bonded by applying a certain pressure thereto to uniformly distribute the liquid crystal to the entire image display region to form a liquid crystal layer.

Thus, in the case where the liquid crystal layer is formed in the liquid crystal display panel through the dropping method, the seal pattern is formed as a closed pattern surrounding the outer edge of the pixel part region to prevent a leakage of liquid crystal to outside of the image display region.

The dropping method allows forming the liquid crystal layer within a relatively short time compared to the time used by the vacuum injection method and can quickly form the liquid crystal layer even when the liquid crystal display panel is large.

In addition, since only the desired amount of liquid crystal is dropped on the substrate, an increase in the unit cost of the liquid crystal display panel due to discarding the high-priced liquid crystal can be prevented enhancing the price competitiveness of the LCD panels.

After the upper and lower substrates on which liquid crystal has been dropped and the sealant has been coated are aligned, a pressure is applied thereto to bond the lower and upper substrate together with the sealant and to spread the dropped liquid crystal uniformly on the entire portion of the panel (step S108').

Through the above described processes, the plurality of liquid crystal display panels with the liquid crystal layer formed thereon are formed on the large-scale glass substrates (upper and lower substrates). The glass substrates are processed and cut into a plurality of liquid crystal display panels, which are then inspected to thereby finish fabrication of the liquid crystal display panel (steps S109' and S110').

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for cutting a liquid crystal display panel comprising:
    transferring a pair of mother substrates on which a plurality of panel regions has been disposed to a scribing unit through a convey unit;
    forming first and second prearranged cut lines on front and rear surfaces of the mother substrates using a scribing unit;
    transferring the mother substrates with the first and second prearranged cut lines formed thereon to a breaking component through the convey unit;
    moving a transfer unit which includes a body having a plurality of suction members, a steam generator installed at an edge of the body and a pusher installed an outer side of the transfer unit to an upper side of the mother substrates;
    moving the transfer unit downward to be close to the surface of the mother substrates and spraying steam toward the first and second prearranged cut lines through the steam generators of the transfer unit;
    fixedly adsorbing the surface of the panel regions to be extracted through the adsorption members while the steam spraying through the steam generators are maintained for a certain pre-set time to further make cracks formed along the first and second prearranged cut lines;
    moving the transfer unit upward to separate liquid crystal display panels formed at the panel regions from a dummy glass therearound while spraying steam onto the surface of the mother substrates through the steam generator of the transfer unit; and
    transferring the liquid crystal display panels absorbed on the absorption members to a reversing unit with the separated dummy glass remaining on the convey unit.

2. The method of claim 1, wherein a plurality of steam generators are formed along the edge of the body.

3. The method of claim 1, wherein the steam generator has a form corresponding to the shape of the liquid crystal display panel.

4. The method of claim 1, the steam generator has a rectangular shape.

5. The method of claim 1, the steam generator has a circular shape.

6. The method of claim 1, wherein forming the first and second prearranged cut lines on the front and rear surfaces of the mother substrates includes:
    forming the first prearranged cut lines for sectioning the panel regions on the front and rear substrates of the mother substrates in a first direction through a scribing unit; and
    forming the second prearranged cut lines for sectioning the panel regions on the front and rear substrates of the mother substrates in a second direction by driving a head provided at the scribing unit in a second direction.

7. The method of claim 1, wherein forming the first and second prearranged cut lines includes forming the first and second prearranged cut lines to cross substantially perpendicularly.

8. The method of claim 1, wherein the breaking component includes a breaking unit installed at the breaking component to form cracks along the first and second prearranged cut lines of the mother substrates.

9. The method of claim 8, wherein the breaking unit includes a steam break to spray steam onto the front and rear surfaces of the mother substrates.

10. The method of claim 9, wherein the breaking unit includes an air knife installed at a rear surface of the steam break to spray air onto the surface of the mother substrate.

11. The method of claim 8, wherein the steam generator of the transfer unit is arranged to propagate cracks formed along the first and second prearranged cut lines through the breaking unit.

12. The method of claim 1, wherein the steam generator of the transfer unit spray steam on the surface of the mother substrates is arranged to expand the mother substrates by heat and pressure to thereby form cracks along the first and second prearranged cut lines or further making formed cracks.

13. A method for fabricating a liquid crystal display panel comprising:
  providing first and second mother substrates divided into a plurality of panel regions;
  performing an array process on the first mother substrate for an array substrate and performing a color filter process on the second mother substrate for a color filter substrate;
  forming an alignment film on the surface of the first and second mother substrates;
  performing rubbing on the alignment film-formed first and second mother substrates;
  bonding together the first and second rubbing-finished mother substrates;
  forming first and second prearranged cut lines on front and rear surfaces of the bonded mother substrates through a scribing unit;
  moving a transfer unit which includes a body having a plurality of suction members, a steam generator installed at an edge of the body and a pusher installed an outer side of the transfer unit to an upper side of the first and second mother substrates;
  moving the transfer unit downward to be close to the surface of the mother substrates and spraying steam toward the first and second prearranged cut lines through the steam generators of the transfer unit;
  fixedly adsorbing the surface of the panel regions to be extracted through the adsorption members while the steam spraying through the steam generators are maintained for a certain pre-set time to further make cracks formed along the first and second prearranged cut lines;
  moving the transfer unit upward to separate liquid crystal display panels formed at the panel regions from a dummy glass therearound while spraying steam onto a surface of the first and second mother substrates through the steam generator of the transfer unit; and
  transferring the liquid crystal display panels absorbed on the absorption members to a reversing unit with the separated dummy glass remaining on a convey unit.

14. The method of claim 13, wherein forming the first and second prearranged cut lines on the front and rear surfaces of the mother substrates comprises:
  forming the first prearrange cut lines for sectioning the panel regions on the front and rear substrates of the mother substrates in a first direction through a scribing unit; and
  forming the second prearrange cut lines for sectioning the panel regions on the front and rear substrates of the mother substrates in a second direction by driving a head provided at the scribing unit in a second direction.

15. The method of claim 13, wherein forming the first and second prearranged cut lines on the front and rear surfaces of the mother substrates comprises forming the first and second prearranged cut lines cross substantially vertically.

16. The method of claim 13, further comprising forming cracks along the first and second prearranged cut lines on the mother substrates using a breaking unit.

17. The method of claim 16, wherein the breaking unit includes a steam break to spray steam onto the front and rear surfaces of the mother substrates.

18. The method of claim 17, wherein the breaking unit includes an air knife installed at a rear surface of the steam break and wherein the method further comprises spraying air onto the surface of the mother substrates.

19. The method of claim 16 further comprising propagating cracks formed along the first and second prearranged cut lines with the breaking unit using the steam generator of the transfer unit.

20. The method of claim 13, further comprising spraying steam using the steam generator of the transfer unit onto the surface of the mother substrates to expand the mother substrates by heat and pressure to thereby form cracks along the first and second prearranged cut lines.

21. The method of claim 13, further comprising spraying steam using the steam generator of the transfer unit onto the surface of the mother substrates to expand the mother substrates by heat and pressure to thereby propagate cracks along the first and second prearranged cut lines.

22. The method of claim 13, wherein the panel regions on the upper portion of the bonded mother substrates are array substrates on which TFTs have been formed through the array process and the panel regions on the lower portion of the mother substrates are color filter substrates on which color filters have been formed through the color filter process.

23. The method of claim 13, wherein the plurality of panel regions includes panel regions having at least two different sizes.

24. The method of claim 13, further comprising:
  dropping liquid crystal on one of the rubbing-finished mother substrate for the array substrate and the mother substrate for the color filter substrate; and
  coating sealant on the other one of the rubbing-finished mother substrate for the array substrate and the mother substrate for the color filter substrate.

25. The method of claim 24, wherein bonding together the first and second rubbing-finished mother substrates is performed after dropping liquid crystal on one of the rubbing-finished mother substrate for the array substrate and the mother substrate for the color filter substrate.

26. The method of claim 13, further comprising:
  forming spacers on one of the rubbing process-finished mother substrate for the array substrate and the mother substrate for the color filter substrate; and
  coating sealant on the other one of the rubbing process-finished mother substrate for the array substrate and the mother substrate for the color filter substrate.

27. The method of claim 26, wherein bonding together the first and second rubbing-finished mother substrates is performed after forming spacers on one of the rubbing process-finished mother substrate for the array substrate and the mother substrate for the color filter substrate.

28. The method of claim 27, further comprising after separating liquid crystal display panels formed at the panel regions from a dummy glass therearound from the bonded mother substrates, injecting liquid crystal into a separated liquid crystal display panel.

* * * * *